Figure 1:
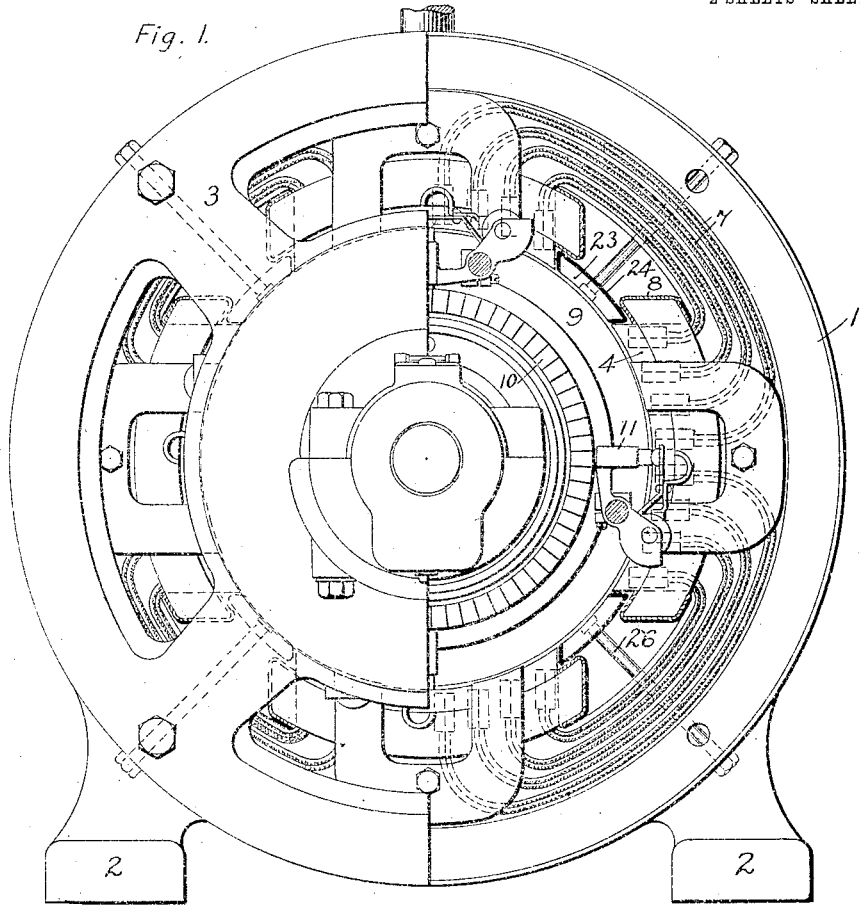

No. 811,231. PATENTED JAN. 30, 1906.
B. G. LAMME.
ALTERNATING CURRENT MOTOR.
APPLICATION FILED JUNE 30, 1904.

2 SHEETS—SHEET 1.

WITNESSES
Fred H. Miller
Chas Harkness

INVENTOR
Benj. G. Lamme
BY
Wesley G. Carr
ATTORNEY

No. 811,231. PATENTED JAN. 30. 1906.
B. G. LAMME.
ALTERNATING CURRENT MOTOR.
APPLICATION FILED JUNE 30, 1904.

2 SHEETS—SHEET 2.

WITNESSES:
Fred H Miller
Chas Harkness

INVENTOR
Benjamin G. Lamme
BY
Wesley G Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT MOTOR.

No. 811,231.      Specification of Letters Patent.      Patented Jan. 30, 1906.

Application filed June 30, 1904. Serial No. 214,821.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Alternating-Current Motors, of which the following is a specification.

My invention relates to alternating-current motors, and particularly to such motors as have their armature-windings connected to commutators in a manner similar to that employed in motors operated by direct currents.

The object of my invention is to provide a simple and effective means for neutralizing the self-induction of the armature without otherwise modifying or disturbing the magnetic relations of the armature and field-magnet of the motor.

Direct-current motors may be operated by either single-phase or polyphase alternating currents provided the reversals of magnetism in the armature and in the field-magnet occur simultaneously; but if a motor of the direct-current type is to be operated continuously by alternating currents its magnetic circuits should be laminated throughout and other minor alterations should also be made.

The self-induction of the armature of a motor of the direct-current type when supplied with alternating currents causes the current in that member to lag behind the impressed electromotive force, and unless such lag is neutralized the efficiency of the motor is impaired. I propose to partially neutralize the self-induction of the armature of an alternating-current motor by means of a stationary winding located in slots in the faces of the field-magnet pole-pieces and connected in series with the armature-winding and so distributed that the number of its ampere-turns in each pole-face is equal to the number of ampere-turns in that part of the armature which is covered by the winding in such pole-face. I propose also to apply a current of one phase to the armature and neutralizing windings and a current of a different phase to the field-magnet winding. It follows from the disposition and arrangement of windings that the neutralizing effect of the stationary winding connected in series with the armature is instantaneous, that it is equal or proportional to the self-induction of the armature, and that the magnetic relations of the armature and field-magnet are not otherwise modified or disturbed.

In the construction of motors having commutators and intended and adapted for operation by alternating currents it has been found to be advisable to provide definite field-magnet pole-pieces between which are definite interpolar spaces, substantially as in ordinary direct-current machines, and in order to insure a satisfactory power factor in motors of this character it has been found desirable to provide armature ampere-turns, the number of which shall be relatively large as compared with the number of ampere-turns required to magnetize the field-magnet. Under such conditions the field distortion caused by the armature ampere-turns would be very great if it were not for the neutralizing-winding in the field-magnet pole-faces, and even where such windings are employed they do not neutralize the armature ampere .urns in the interpolar spaces. In the case of direct-current motors the armature magneto-motive force in the interpolar space is relatively so small that it has but little effect on the operation of the motor; but in the case of an alternating-current motor having currents supplied to the armature that differ in phase from those supplied to the field-magnet and having a large number of ampere-turns in the armature as compared with the number of field ampere-turns the armature magneto-motive forces exerted in the interpolar spaces may be relatively large. Experience has demonstrated that this effect may be so great under certain conditions as to set up a hunting action in the machine, during which the armature-current rises and falls periodically. In such operation the magnetic effect in the interpolar spaces will also rise and fall periodically, and there will be a distorting effect in the field which will tend to cause the hunting action to continue. In order to eliminate this hunting effect, I propose to place conducting-plates of comparatively large cross-section and very low resistance between the pole-pieces of the motor. These plates act as secondaries to the interpolar field set up by the armature-currents, and therefore reduce such field to a comparatively small value, the hunting tendency being thereby substantially eliminated.

Figure 2:
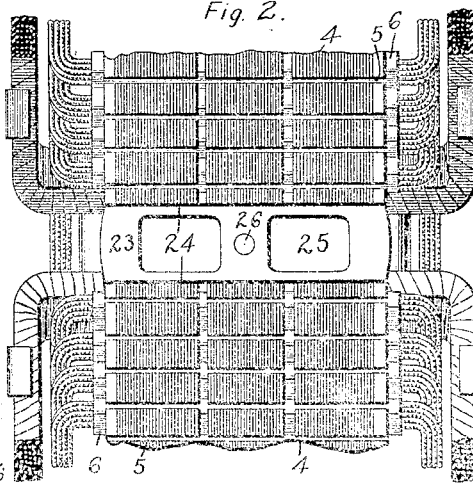
Figure 3:
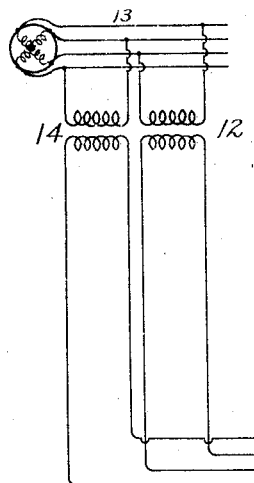
Figure 3:
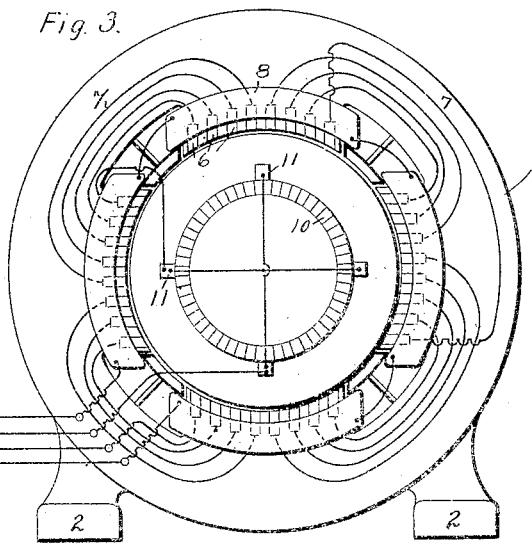
Figure 4:
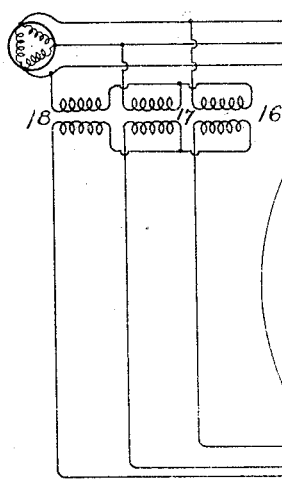
Figure 4:
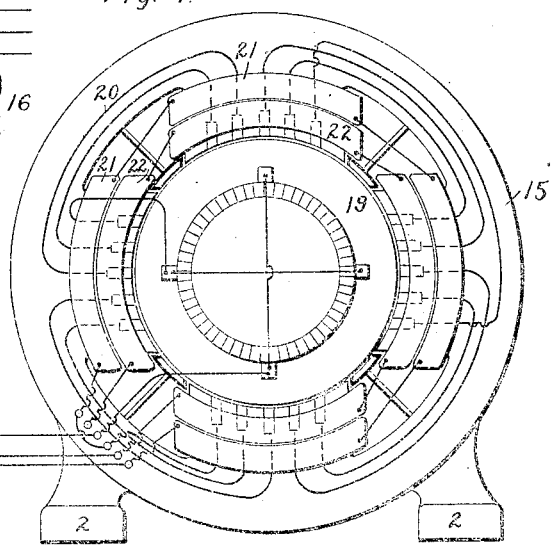
Figure 5:
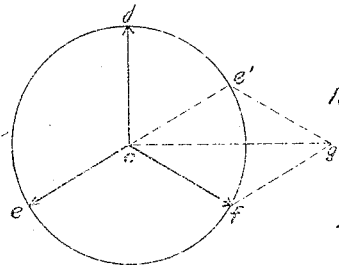

In the accompanying drawings, Figure 1 is a view in end elevation of a motor embodying my invention, one-half of the end cap being removed. Fig. 2 is a face view of one-half of each of two adjacent pole-pieces, their windings, and the plate located between them. Fig. 3 is an end view of a motor constructed in accordance with my invention and showing the supply-circuits, as well as the neutralizing-windings and plates, the drawing being mainly diagrammatic. Fig. 4 is a view similar to Fig. 3, but showing a motor supplied with three-phase currents. Fig. 5 is a diagram of the phase relations of the electromotive forces in the three-phase motor.

As here indicated, the motor-frame comprises a substantially cylindrical body portion 1, having supporting-legs 2 and provided at its ends with open-work caps 3.

While the invention is not limited to a motor having a specific number of poles, I have here indicated a four-pole motor, each of the laminated pole-pieces 4 of which is provided with eight slots 5 adjacent to its face, in which are located neutralizing-conductors 6. One-half of the neutralizing-conductors in each pole-piece is connected to the neutralizing-conductors which are located in the slots of the adjacent half of the adjacent pole-piece by means of portions 7, which may be either integral extensions of the conductors that are located in the pole-piece slots or separately-constructed connectors that are suitably fastened to the projecting ends of said core-slot conductors. In order that the end portions may not interfere with the application and removal of the magnetizing-coils 8, they are bent outward in a plane substantially parallel to the end of the motor and then around the adjacent space between the pole-pieces, so that none of them cross such space.

While I have shown each of the field-magnet pole-pieces as provided with eight slots in which the neutralizing-winding is located, it is obvious that the number and dimensions thereof may be varied within practical limits, as may be desired or found convenient.

The armature 9, the commutator-drum 10, and the brushes and holders 11 may be of any desired construction suitable for use in motors of the character here shown and described.

As shown in Fig. 3, the neutralizing-windings 6 7 are connected in series with the armature-winding by means of the brushes 11 and commutator-cylinder 10, and these series-connected windings are supplied with current from the secondary of a transformer 12, the primary of which is connected to conductors corresponding to one phase of a two-phase circuit 13, and the magnetizing field-magnet coils 8 are supplied with current from the secondary winding of a transformer 14, the primary of which is supplied with current from the conductors corresponding to the other phase of the two-phase system 13, this arrangement being such that the armature self-induction is effectually neutralized except in the interpolar spaces. Since the self-induction of the armature is thus neutralized, the current of the phase which is supplied to the armature is maintained in phase with the impressed electromotive force; but the self-induction of the field-magnet causes the current of the phase which is supplied to that member to lag approximately ninety degrees behind the impressed electromotive force, so that the currents in the two windings are approximately one hundred and eighty degrees apart, and the reversals of the magnetism in the armature and in the field-magnet occur simultaneously, this being the proper condition for satisfactory operation.

In Fig. 4 I have shown a motor 15, that is supplied with three-phase currents from transformers 16, 17, and 18, the armature 19 and auxiliary neutralizing-winding 20 being connected in series with each other and supplied with current of one phase. The other two phases of the current are supplied to separate field-magnet windings 21 and 22, which are connected in "star," except that the connections of one of them are reversed.

In Fig. 5, which illustrates diagrammatically the phase relations, the line $c\,d$ represents in magnitude and direction the electromotive force of the armature and lines $c\,e$ and $c\,f$ the electromotive forces of the field-magnet windings for normal star connection. Since the connections of the winding having the electromotive force which would normally be represented by the line $c\,e$ are reversed, the true direction of its electromotive force is represented by the line $c\,e'$. Since the field of the motor is due to the resultant of the currents in the two field-magnet windings, the electromotive force of which is represented in direction and magnitude by the line $c\,g$ that differs ninety degrees in phase from the armature electromotive force $c\,d$, the motor will operate in a manner similar to the motor shown in Figs. 1, 2, and 3.

The armature self-induction of single-phase series motors may also be neutralized by connecting the neutralizing-windings in series with the armature and field-magnet windings, if desired.

In order to neutralize the armature self-induction in the interpolar spaces, I support in such spaces, between the pole-pieces of the field-magnet, comparatively heavy plates 23, which are preferably formed of copper or some other low-resistance material and are separated from the pole-pieces by suitable insulating material 24. These plates 23 are indicated in Fig. 2 as provided with ventilating-openings 25, and they are supported in position by means of bolts 26, which extend radially outward through the frame of the motor. These plates may, however, be of different form and otherwise supported, if desired. For example, while I have shown these plates as located close to the pole-tips, they might be of different form and so disposed that some portions of them at least should be located a considerable distance away from the pole-faces. In general it is desirable, if not necessary, however, to so place these devices that they shall extend from the tip of one pole to the tip of the adjacent pole, so as to form a closed electric circuit, even though they should extend backward along the sides of the pole-piece and be joined by a bridging portion at some distance back from the pole-faces. Another possible advantage incident to the use of the device just described is the diminution of the magnetic field which is set up by the field-magnet coils between the pole-pieces, thereby winding the neutral space of the motor. This is not in general an important feature, however, since the field ampere-turns are of such relatively low value that there is little tendency to a spreading of the lines of force from the poles into the interpolar spaces. A further advantage incident to the employment of this plate between the pole-pieces, provided the same is placed close to the armature, will be found in the assistance afforded to commutation by reason of the provision of a low-resistance secondary path directly over the slot which contains the coil that is being commutated, the local field set up by the commuted coil being thus damped to a slight extent.

As I have already indicated, my invention is not limited to the specific form and arrangement of neutralizing means, nor to the application of such means to a motor of any specific form or number of poles.

I claim as my invention—

1. An electric motor having armature and field-magnet windings that are supplied with currents of different phases and having field-magnet pole-pieces that are provided with slots parallel to the armature-axis, neutralizing-conductors located in said slots, and low-resistance plates that bridge the spaces between the tips of adjacent pole-pieces and are insulated therefrom.

2. An electric motor having armature and field-magnet windings that are supplied with dephased currents and having field-magnet pole-pieces that are provided with slots parallel to the armature-axis, a neutralizing-winding located in said slots and connected in series with the armature-winding, and low-resistance plates located in the interpolar spaces.

3. The combination with a source of multiphase electrical energy, of a motor having a field-magnet winding supplied from said source with current of one phase and an armature-winding supplied from said source with current of a different phase, field-magnet pole-pieces provided with slots parallel to the armature-axis, a neutralizing-winding located in said slots and connected in series with the armature-winding, and plates of low-resistance, conducting material located in the interpolar spaces.

4. An electric motor having armature and field-magnet windings that are supplied with dephased currents and having field-magnet pole-pieces that are provided with slots parallel to the armature-axis, conductors that are connected in series with the armature-winding and are located in said slots for neutralizing the self-induction of the adjacent armature-conductors, and low-resistance plates located in the interpolar spaces for neutralizing the self-induction of the armature-conductors between the pole-tips.

5. An electric motor having armature and field-magnet windings that are supplied with dephased currents and having field-magnet pole-pieces that are provided with slots parallel to the armature-axis, neutralizing-conductors that are located in said slots and are connected in series with the armature-winding and low-resistance plates that are located in the interpolar spaces for neutralizing the self-induction of the armature-conductors between the pole-tips, and insulating material between the plates and the pole-tips.

6. An electric motor having field-magnet pole-pieces provided with slots substantially parallel to the armature-axis, neutralizing-windings located in said slots and connected in series with the armature-winding and low-resistance plates located in the interpolar spaces for neutralizing the self-induction of the armature-conductors between the pole-tips, in combination with means for supplying current of one phase to the field-magnet winding and current of a different phase to the armature and neutralizing windings.

In testimony whereof I have hereunto subscribed my name this 28th day of June, 1904.

BENJ. G. LAMME.

Witnesses:
E. M. STEWART,
BIRNEY HINES.